United States Patent [19]

Schultz

[11] Patent Number: 5,189,400
[45] Date of Patent: Feb. 23, 1993

[54] COMMUNICATION DEVICE CAPABLE OF PREVENTING ENERGY SOURCE REMOVAL

[75] Inventor: Charles P. Schultz, Hialeah, Fla.

[73] Assignee: Motorola, Inc., Schaumburg, Ill.

[21] Appl. No.: 826,185

[22] Filed: Jan. 21, 1992

Related U.S. Application Data

[63] Continuation of Ser. No. 550,933, Jul. 11, 1990, abandoned.

[51] Int. Cl.⁵ .............................................. G08B 21/00
[52] U.S. Cl. .................................... 340/636; 340/635; 429/97; 320/48
[58] Field of Search .......... 340/455, 636, 635, 825.44; 429/96, 97, 98, 99, 100; 320/2, 48; 70/241

[56] References Cited

U.S. PATENT DOCUMENTS

| 3,648,491 | 3/1972 | Kennard | 70/241 |
| 4,366,430 | 12/1982 | Wright | 320/25 |
| 4,831,356 | 5/1989 | Ito | 340/426 |
| 4,929,931 | 5/1990 | McCuen | 340/455 X |

Primary Examiner—Jin F. Ng
Assistant Examiner—Jeffrey A. Hofsass
Attorney, Agent, or Firm—Pedro P. Hernandez; Thomas G. Berry

[57] ABSTRACT

A communication device (100) activates a latch (148) so as to prevent the removal of an energy source upon the detection of a predetermined event or activity.

28 Claims, 10 Drawing Sheets

COMMUNICATION DEVICE CAPABLE OF PREVENTING ENERGY SOURCE REMOVAL

This is a continuation of application Ser. No. 550,933, filed Jul. 11, 1990, and now abandoned.

TECHNICAL FIELD

This invention relates generally to communication devices, and more specifically to battery powered communication devices, and is particularly directed toward a battery powered communication device capable of preventing removal of its battery (energy source).

BACKGROUND

Many contemporary electronic devices utilize a "graceful" power-down to deactivate or turn off the device. That is, the activation of the ON/OFF switch itself does not apply or remove power from the circuitry of the electronic device. Rather, activation of the OFF switch signals a controller or computer within the electronic device to execute a software routine that insures certain memory elements are protected before power is disconnected via a command from the controller or computer. In this way, data and other information necessary for the proper operation of the electronic device is protected.

Moreover, it is common in contemporary electronic devices to continually power (operate) some circuitry even when the electronic device is believed to be OFF. For example, many electronic devices incorporate a real time clock. Also, in a communication context, may contemporary communication devices continually (or periodically) synchronize to transmitted signals or process certain other signalling or control information in a manner that is transparent to the user since such processing is done in a STANDBY or OFF condition.

There is, however, a significant risk for battery powered electronic devices in that proper operation of the electronic devices can be detrimentally affected if the battery (energy source) is removed while the electronic device is receiving, processing, or protecting important information. Since the user or operator of the device may not be aware of the many operations performed in the OFF or STANDBY mode, a user may remove the battery (energy source) without realizing that important data may be lost. Accordingly, a need exists for a method of preventing removal the battery (energy source) during certain activities or upon detection of certain events.

SUMMARY OF THE INVENTION

Briefly, according to the invention, a communication device prevents removal of an energy source upon the detection of an event or activity.

DETAILED DESCRIPTION OF THE PREFERRED EMBODIMENT

Figure 1:
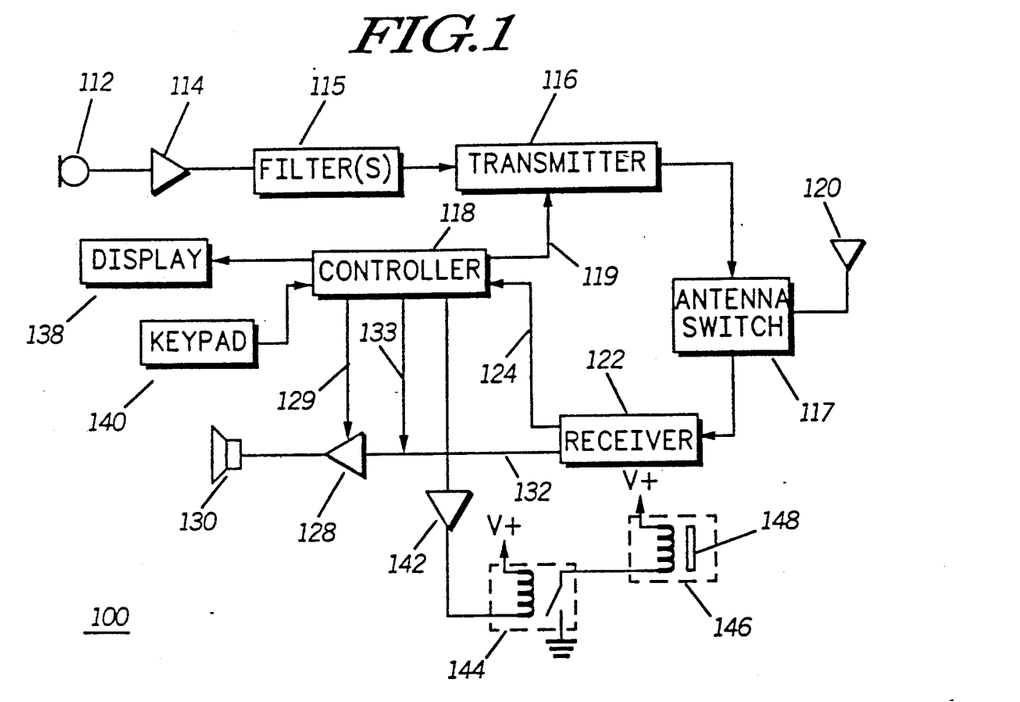
FIG. 1 is a block diagram of a communication device in accordance with the present invention.

Referring to FIG. 1, there is shown a block diagram of a two-way communication device 100 (e.g., Conventional, Trunked or Digital Land Mobile Communication Devices) in accordance with the present invention. Operationally, speech energy impressed upon a microphone 112 is amplified via an amplifier 114 prior to being filtered by one or more filters 115. A transmitter 116 receives the filtered voice information 115, and/or digital information from a controller 118, and modulates this information in a conventional manner. The transmitter 116 is coupled to an antenna 120 by an antenna switch 117 so that the modulated information may be transmitted to other communication devices.

To receive a signal, the antenna switch 117 preferably couples the antenna 120 to a receiver 122, which may be of conventional design. However, those skilled in the art will appreciate that full duplex communication (e.g., cellular telephone) may be achieved by replacing the antenna switch with a conventional duplexer. In any event, voice messages recovered by the receiver 122 are provided (132) to an amplifier 128 that is controlled (129) via the controller 118. Preferably, the controller 118 provides an indication of a received message such as by injecting (133) an annunciation tone to the amplifier 128. After amplification, the recovered voice messages are presented to the operator by a speaker 130 at a volume level that may be varied (118, 129) in accordance with the user's or operator's preference via a keypad 140.

The receiver 122 provides recovered digital information to the controller 118 via a received data line 124. Preferably, messages intended for a particular communication device 100 contain an address code that correspond to one or more address codes stored within the controller 118. Accordingly, a digital address is one type of recovered information that the receiver 122 would pass to the controller 118. Additionally, synchronization and control information is contemplated by the present invention to be accomplished in a digital manner. Moreover, digital messages (e.g., text, alphanumeric data, etc.) may be addressed by the communication device 100 for presentation to an operator via a display 138.

According to the invention, the communication device 100 operates in a plurality of modes. The most fundamental mode, of course, is the ON mode, wherein the user or operator of the communication device 100 is employing one or more features of the communication device to effect communications with others. When not actively engaged in communication, the communication device 100 may automatically or via operator command enter a STANDBY mode. In the STANDBY mode, nonessential circuits are temporarily inactivated on a periodic basis so as to prolong the operational lifetime of an energy source (e.g., battery) powering the communication device 100.

The present invention contemplates that in the STANDBY mode, the communication device 100 will continue to receive certain information such as signalling and control information, emergency codes, re-programming data, and other information as may be desired in any particular implementation. This reception and processing is preferably performed in a manner that is transparent to the user and does not require any significant user input or control. Some or all of the transparent reception of information is contemplated to continue when the user enters the OFF mode such as by activating an ON/OFF switch from the keypad 140. However, since the user or operator may not fully appreciate that the communication device 100 continues to process information in the OFF mode, the user may inadvertently remove the energy source at an inappropriate time. However, removal of the energy source at a time when the communication device is engaged in certain activities (e.g., transparent reception or processing of information) may frustrate or prevent the proper operation of the communication device 100. Therefore, the present invention contemplates in the preferred embodiment that the controller 118 will activate (142) a latching relay 144 upon the detection of certain events or the initiation of certain activities. Such events or activities preferably comprise, but are not limited to, synchronization, reprogramming all or a portion of the controller memory, emergency message processing, etc.

When activated, the latching relay activates a solenoid 146 that causes a plunger (or shaft) 148 to actively prevent the removal of the energy source at any time where such removal may detrimentally affect the proper operation of the communication device 100. After the completion of the activity or event, or the reception of a radio frequency command (120, 117, 122, 124), the relay 144 (and thus the solenoid 146) is inactivated to that the power source may be removed. In this way, the present invention ensures controlled power source removal. Optionally, the display 138 may present a visual indication that the battery is locked.

Figure 2A:
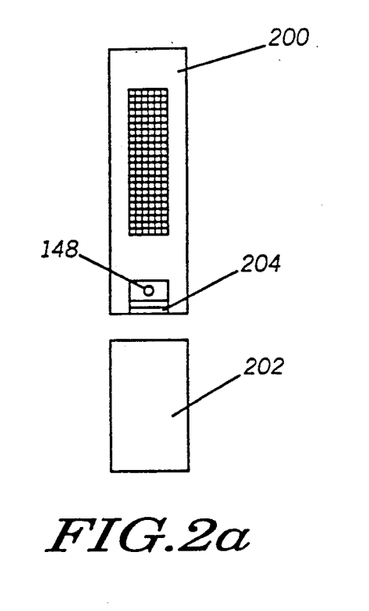
FIGS. 2a-2d are illustrations of communication devices in accordance with the present invention.

Referring to FIG. 2a, the communication device 100 may be seen to be enclosed within housing 200, and having an attached battery assembly 202. Ordinarily, the battery assembly 202 may be removed from the communication device housing 200 via operating a release mechanism 204. However, the present invention contemplates positioning the plunger 148 of the solenoid 146 in such a way as to block or prohibit the operation of the release mechanism 204 so as to prevent the removal of the energy source assembly 202.

Figure 2B:
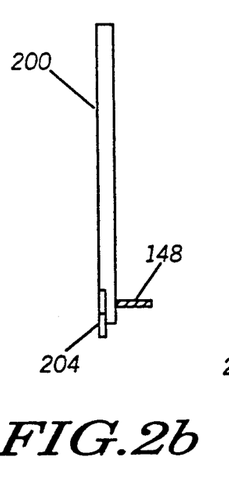
Figure 2C:
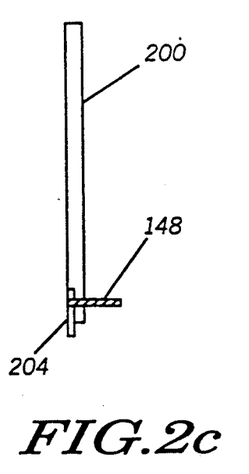

The preferred operation of the solenoid is more clearly illustrated with reference to FIGS. 2b and 2c. In FIG. 2b, the plunger 148 is illustrated disengaged (deactivated) from the release mechanism 204, which would be free to travel upwardly so as to release the battery assembly 202. Conversely, FIG. 2c illustrates the plunger 148 engaged (activated) so as to block the movement of the release mechanism 204. Since the release 204 cannot operate, the battery assembly 202 remains attached to and powering the circuitry within the housing 200.

Figure 2D:
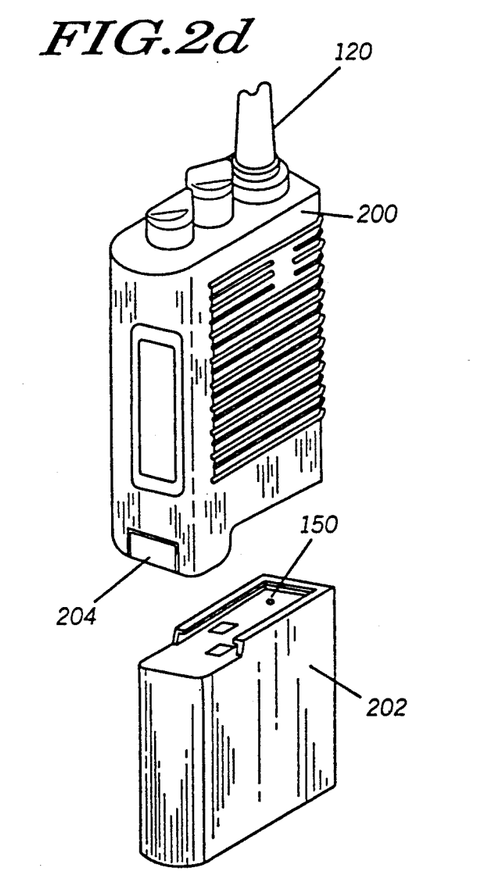

Referring to FIG. 2d, an alternate embodiment is illustrated wherein the plunger 148 is positioned to engage a corresponding aperture 150 in the battery assembly 202. Accordingly, the engaged plunger 148 would prevent the removal of the battery assembly 202 irrespective of whether the release mechanism 204 was activated. Optionally, of course, the embodiments of FIGS. 2a and 2d could be combined for additional latching security.

Figure 3:
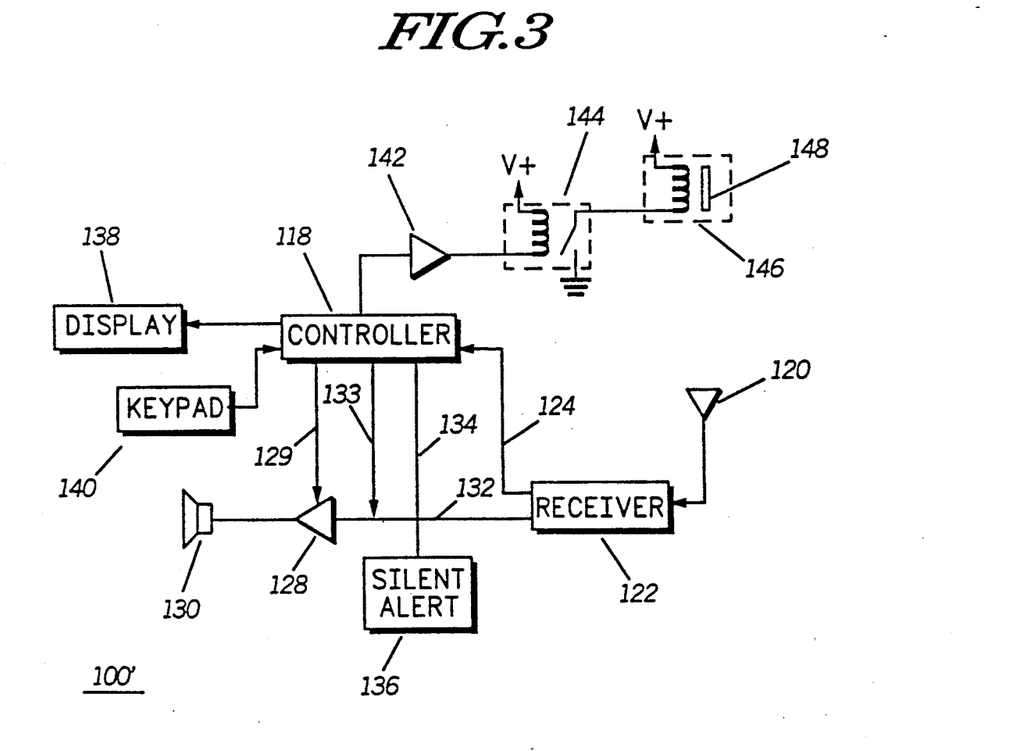
FIG. 3 is a block diagram of another communication device in accordance with the present invention.

Referring to FIG. 3, there is shown a block diagram of a one-way communication device 100' (e.g., selective call receiver or pager) in accordance with the present invention. Operationally, a signal received by the antenna 120 is routed to the receiver 122, which may be of conventional design. Voice messages recovered by the receiver 122 are provided (132) to the amplifier 128 that is controlled (129) via the controller 118. Preferably, the controller 118 provides an indication of a received message such as by injecting (133) the annunciation tone to the amplifier 128. Alternately, a silent (vibratory) alert (134, 136) may be presented if selected (140) as the preferred alert by the user of operator. After amplification, the recovered voice messages are presented to the operator by the speaker 130 at a volume level that may be varied (118, 129) in accordance with the user's or operator's preference via the keypad 140.

The receiver 122 provides recovered digital information to the controller 118 via the received data line 124. Preferably, messages intended for a particular communication device 100' contain an address code that correspond to one or more address codes stored within the controller 118. Accordingly, a digital address is one type of recovered information that the receiver 122 would pass to the controller 118. Additionally, synchronization and control information is contemplated by the present invention to be accomplished in a digital manner. Moreover, digital messages (e.g., text, alphanumeric data, etc.) may be addressed by the communication device 100' for presentation to an operator via the display 138.

According to the invention, the communication device 100' operates in a plurality of modes. The most fundamental mode, of course, is the ON mode, wherein the user or operator of the communication device 100' is employing one or more features of the communication device to receive communication from others. When not actively engaged in communication, the communication device 100' may enter may automatically or via operator command enter a STANDBY mode. In the STANDBY mode, nonessential circuits are temporarily inactivated on a periodic basis so as to prolong the operational lifetime of an energy source (e.g., batter) powering the communication device 100'.

The present invention contemplates that in the STANDBY mode, the communication device 100' will continue to receive and process certain information such as signalling and control information, emergency codes, re-programming data, and other information as may be desired in any particular implementation. The reception and processing is preferably performed in a manner that is transparent to the user and does not require any significant user input or control. Some or all of the transparent reception of information is contemplated to continue when the user enters the OFF mode such as by activating an ON/OFF switch from the keypad 140. However, since the user or operator may not fully appreciate that the communication device 100' continues to process information in the OFF mode, the user may inadvertently remove the energy source at an inappropriate time. However, removal of the energy source at a time when the communication device is engaged in certain activities (e.g., transparent reception or processing of information) may frustrate or prevent the proper operation of the communication device 100'. Therefore, the present invention contemplates in the preferred embodiment that the controller 118 will activate (142) the latching relay 144 upon the detection of certain events or the initiation of certain activities. Such events or activities preferably comprise, but are not limited to, synchronization, reprogramming all or a portion of the controller memory, emergency message processing, etc.

When activated, the latching relay activates the solenoid 146 that causes a plunger (or shaft) 148 to actively prevent the removal of the energy source at any where such removal may detrimentally affect the proper operation of the communication device 100. After the completion of the activity or event, or the reception of a radio frequency command (120, 122, 124), the relay 144 (and thus the solenoid 146) is inactivated to that the power source may be removed. In this way, the present invention ensures controlled power source removal. Optionally, the display 138 may present a visual indication that the battery cover is locked.

Figure 4A:
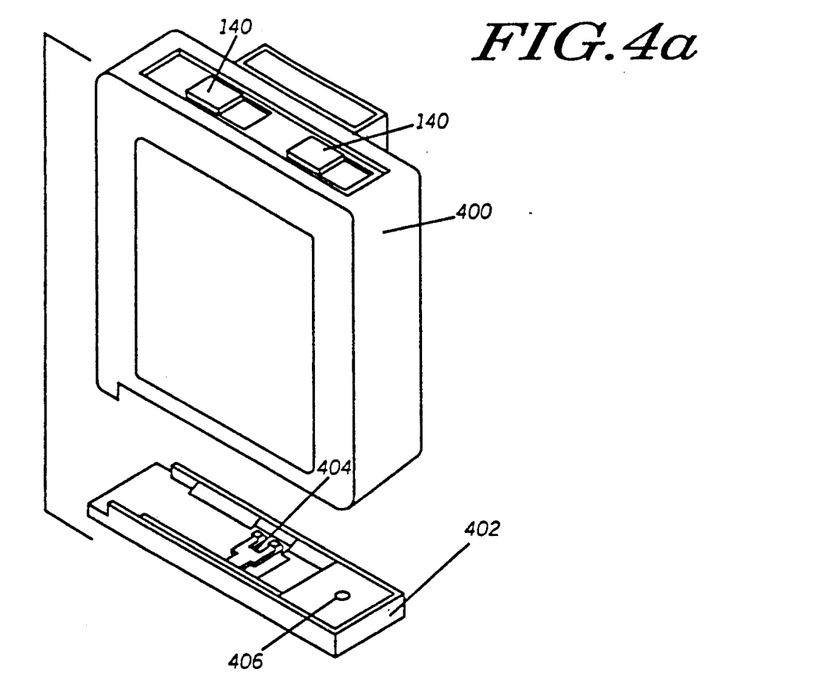
FIGS. 4a and 4b are illustrations of another communication device in accordance with the present invention.

Referring to FIG. 4a, the communication device $\phi'$ may be seen to be enclosed within housing 400, and having an attached battery door or cover 402. Ordinarily, the battery cover 402 may be removed from the communication device housing 400 so as to allow the removal of a battery (energy source). However, the present invention contemplates positioning the plunger 148 to engage a corresponding aperture 406 in the battery door or cover 402. Accordingly, the engaged plunger 148 would prevent the removal of the battery cover 402 irrespective of whether the release mechanism 404 was activated. Those skilled in the art will appreciate that this embodiment offers a technique for preventing removal of industry standard batteries (e.g., AA, AAA, etc.), while the embodiments of FIGS. 2a-2d illustrate a battery (energy source) assembly embodiment.

Figure 4B:
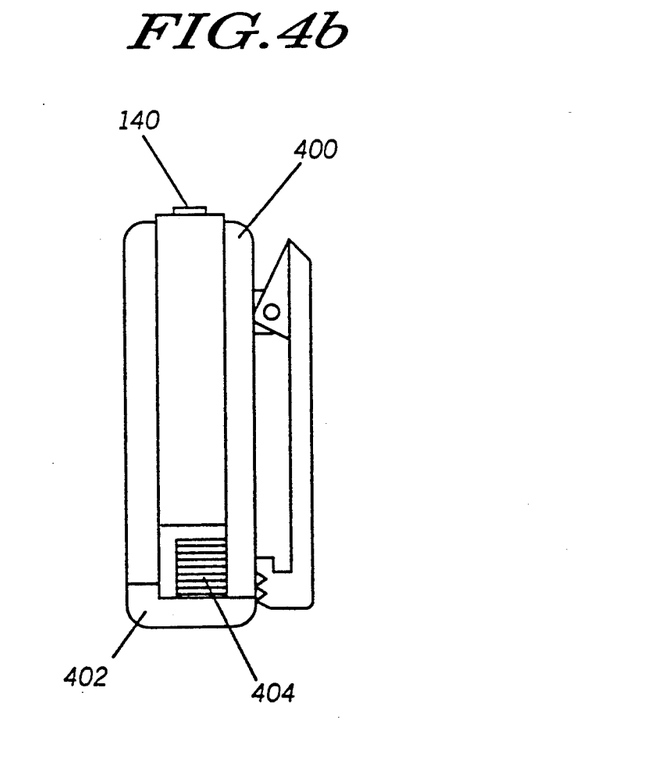

Referring to FIG. 4b, the present invention contemplates a preferred positioning of the plunger 148 in such a way as to block or prohibit the operation of the release mechanism 404 so and to prevent the removal of the energy source assembly 402. Optionally, of course, the embodiments of FIGS. 4a and 4b could be combined for additional latching security.

Figure 5:
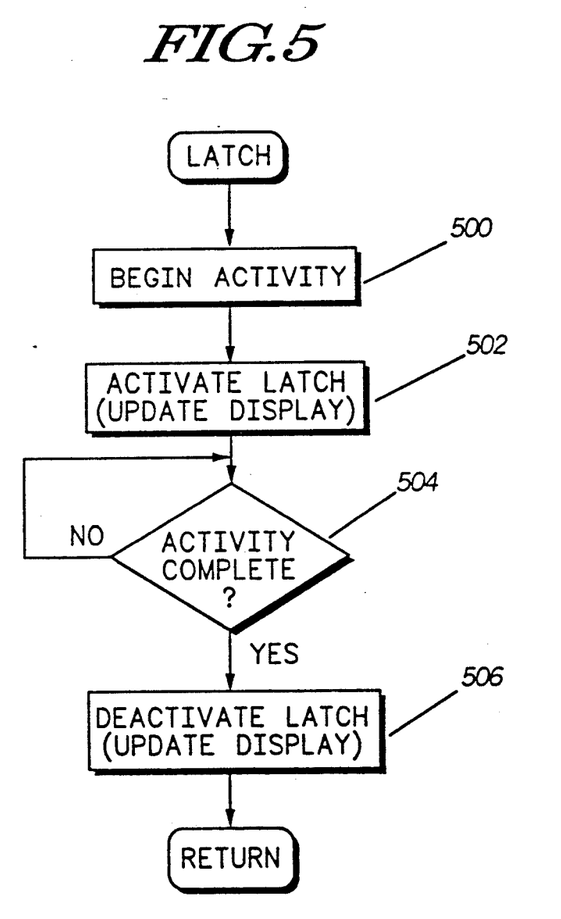
FIG. 5 is a flow diagram illustrating the steps executed by the communication devices of FIGS. 1 and 3 in accordance with the preferred embodiment of the present invention.

Referring to FIG. 5, the preferred operation of the communication device 100 or 100' is illustrated in flow diagram form. The routine (controller operations) begins in step 500, wherein the controller 118 determines whether an activity which should not be interrupted by the removal of power from the energy source has begun. In the preferred embodiment of the present invention, such activities may be implemented via software, and call another software subroutine or task implementing the flow diagram illustrated in FIG. 5. Once the activity has begun (or the event has been detected) the latching mechanism is activated (step 502). Optionally, the display may be updated to indicate that the battery (or battery cover) is locked. Decision 504 determines whether the activity has been completed, and if so, deactivates the latching mechanism (step 506), and optionally updates the display to indicate that the battery (battery cover) is unlocked. In this way, the latch may be selectively activated and deactivated only at those times when energy source removal would be inconvenient or inappropriate depending upon the current action being performed by the communication device 100 or 100'.

Figure 6A:
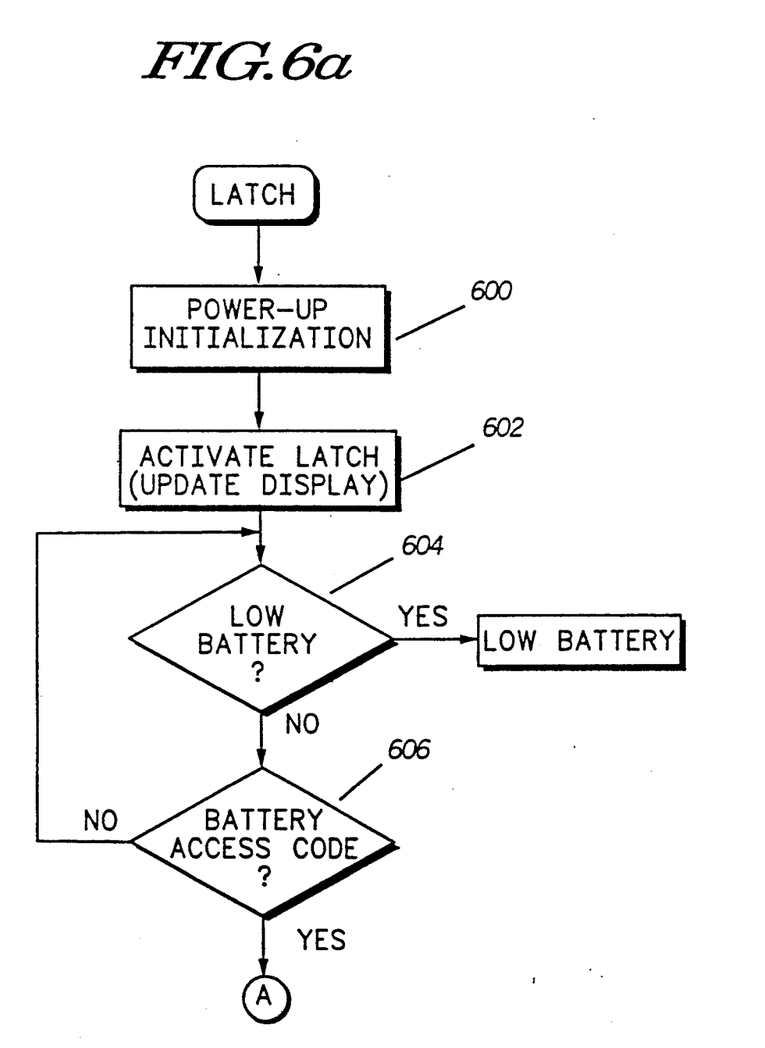
FIGS. 6a and 6b are flow diagrams illustrating the steps executed by the communication devices of FIGS. 1 and 3 in accordance with the an alternate embodiment of the present invention.
Figure 6B:
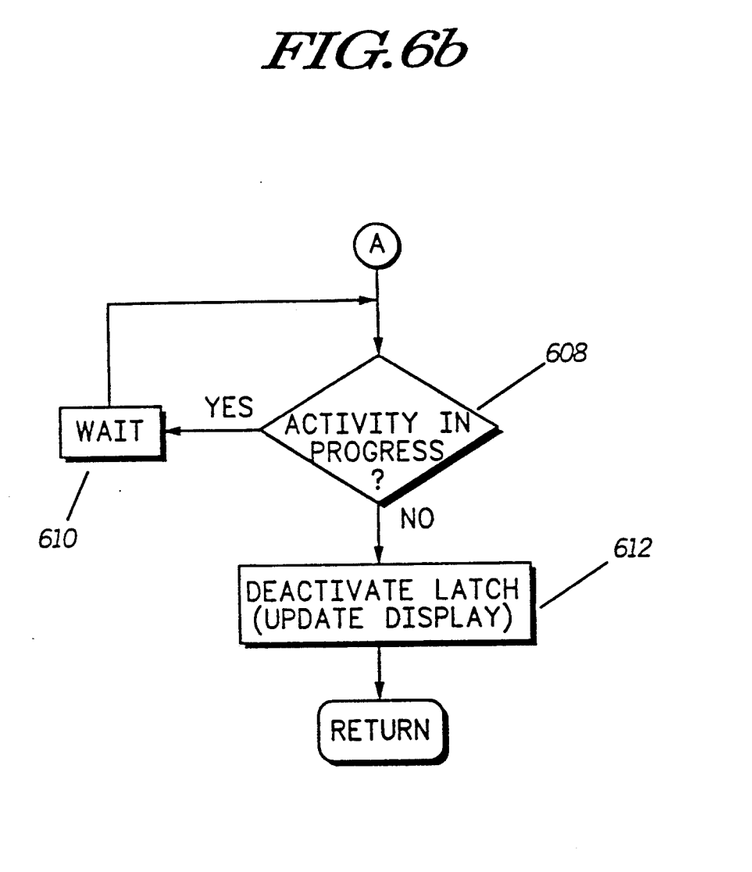

Referring to FIGS. 6a and 6a, an alternate operating procedure of the communication device 100 or 100' is shown. In this embodiment, the communication device is initialized (step 600) following a successful power up (ON mode), after which the latch is automatically activated (step 602). Optionally, the display may be updated to indicate that the battery (battery cover) is locked. In this embodiment, the latch remains activated until deactivated by one or more predetermined events. The first such event comprises a low battery condition, which is determined via conventional techniques in decision 604. An affirmative determination of decision 604 activates the low battery procedure which will be hereinafter discussed in conjunction with FIGS. 8a and 8b. If the determination of decision 604 is that the battery voltage or capacity is not below a certain threshold, the routine (controller) continues to decision 606, which determines whether the operator has entered a battery access code, such as from the keypad 140. That is, this embodiment contemplates the continual locking of the battery (removal prevention) until the operator enters a predetermined code (or password) or as to release the latching mechanism (i.e., the plunger 148). If a code has not been received, the routine (controller) continues to look for a low battery condition or battery access code until one of these events triggers the deactivation of the latching mechanism so as to permit the removal of the battery. Assuming, however, that decision 606 determines that the battery access code was received, the routine (controller) proceeds to decision 608 to determine whether an activity is in progress that should not be interrupted. If so, the routine (controller) waits (step 610) until the activity has been concluded, after which the latch is deactivated (step 612). Optionally, the display may be updated to indicate that the battery (battery cover) is unlocked.

Figure 7A:
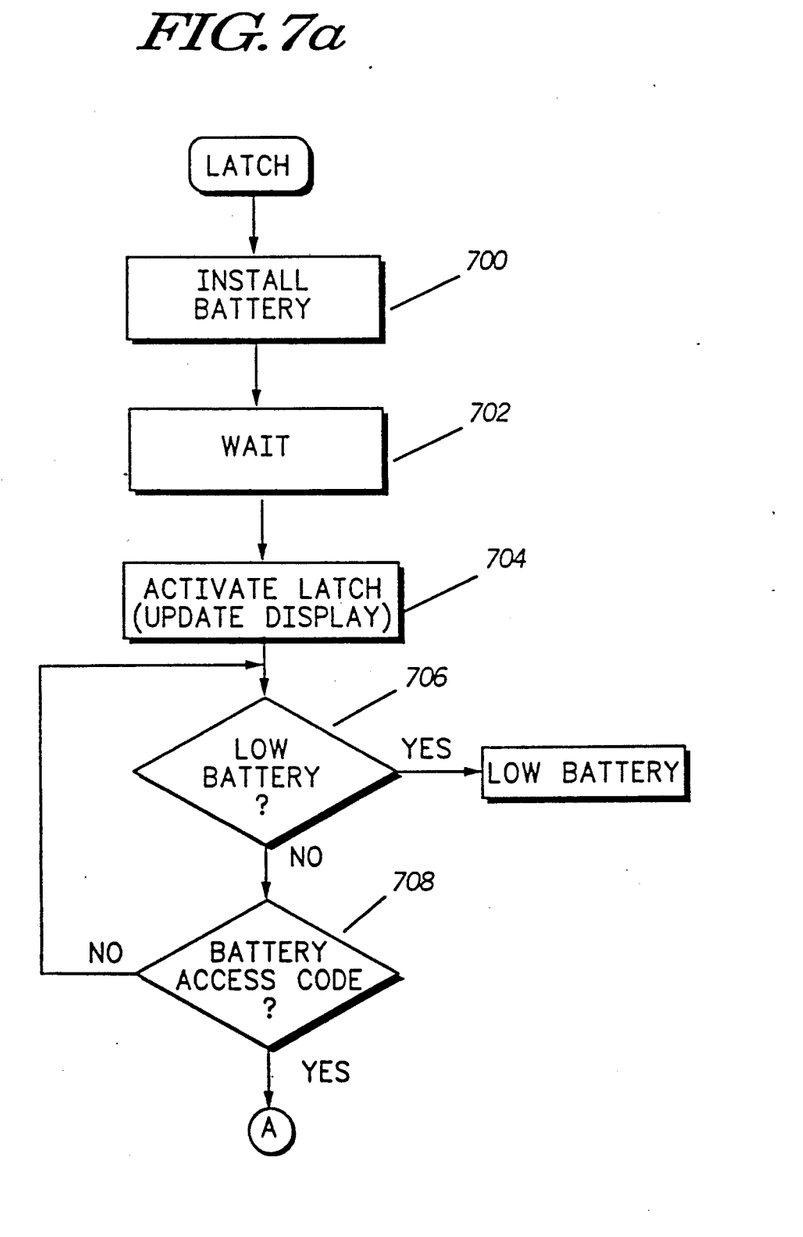
FIGS. 7a and 7b are flow diagrams illustrating the steps executed by the communication devices of FIGS. 1 and 3 in accordance with another alternate embodiment of the present invention.
Figure 7B:
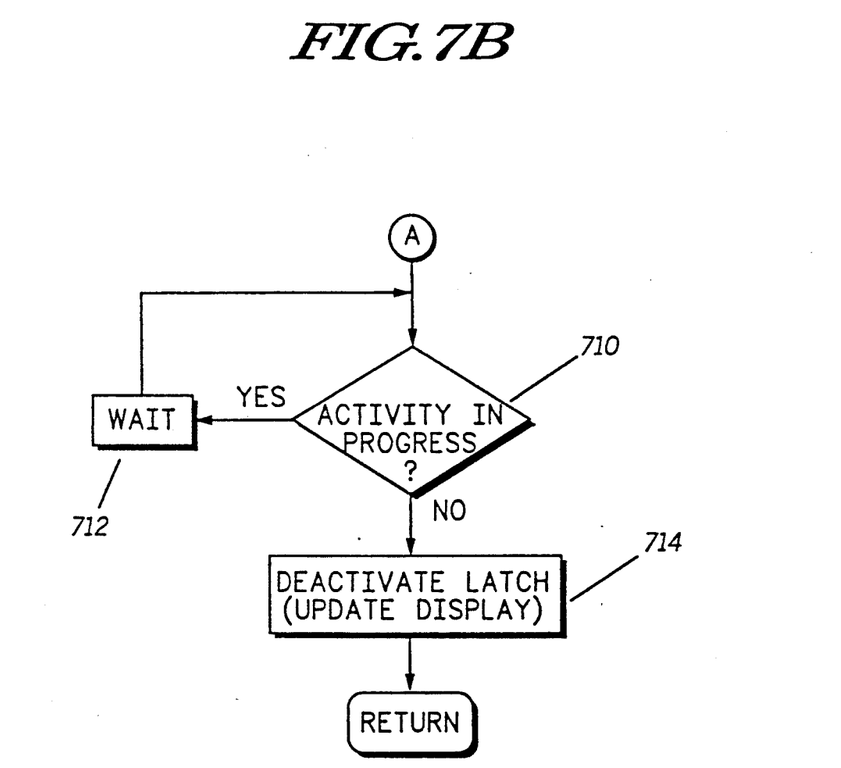

Referring to FIGS. 7a and 7b, another alternate operating procedure of the communication device 100 or 100' is shown. In this embodiment, the latch is automatically activated (step 704) after a predetermined time interval (step 702) from the installation (step 700) of the battery (energy source). Optionally, the display may be updated to indicate that the battery (battery cover) is locked. Once activated, the battery may not be removed until the latch is deactivated by one or more predetermined events. The first such event comprises a low battery condition, which is determined via conventional techniques in decision 706. An affirmative determination of decision 706 activates the low battery procedure which will be hereinafter discussed in conjunction with FIGS. 8a and 8b. If the determination of decision 706 is that the battery voltage of capacity is not below a certain threshold, the routine (controller) continues to decision 708, which determines whether the operator has entered a battery access code, such as from the keypad 140. That is, this embodiment contemplates the continual locking of the battery (removal prevention) until the operator enters a predetermined code (or password) so as to release the latching mechanism (i.e., the plunger 148). If a code has not been received, the routine (controller) continues to look for a low battery condition or battery access code until one of these events triggers the deactivation of the latching mechanism so as to permit the removal of the battery. Assuming, however, that decision 708 determines that the battery access code was received, the routine (controller) proceeds to decision 710 to determine whether an activity is in progress that should not be interrupted. If so, the routine (controller) waits (step 712) until the activity has been concluded, after which the latch is deactivated (step 714). Optionally, the display may be updated to indicate that the battery (battery cover) is unlocked.

Figure 8A:
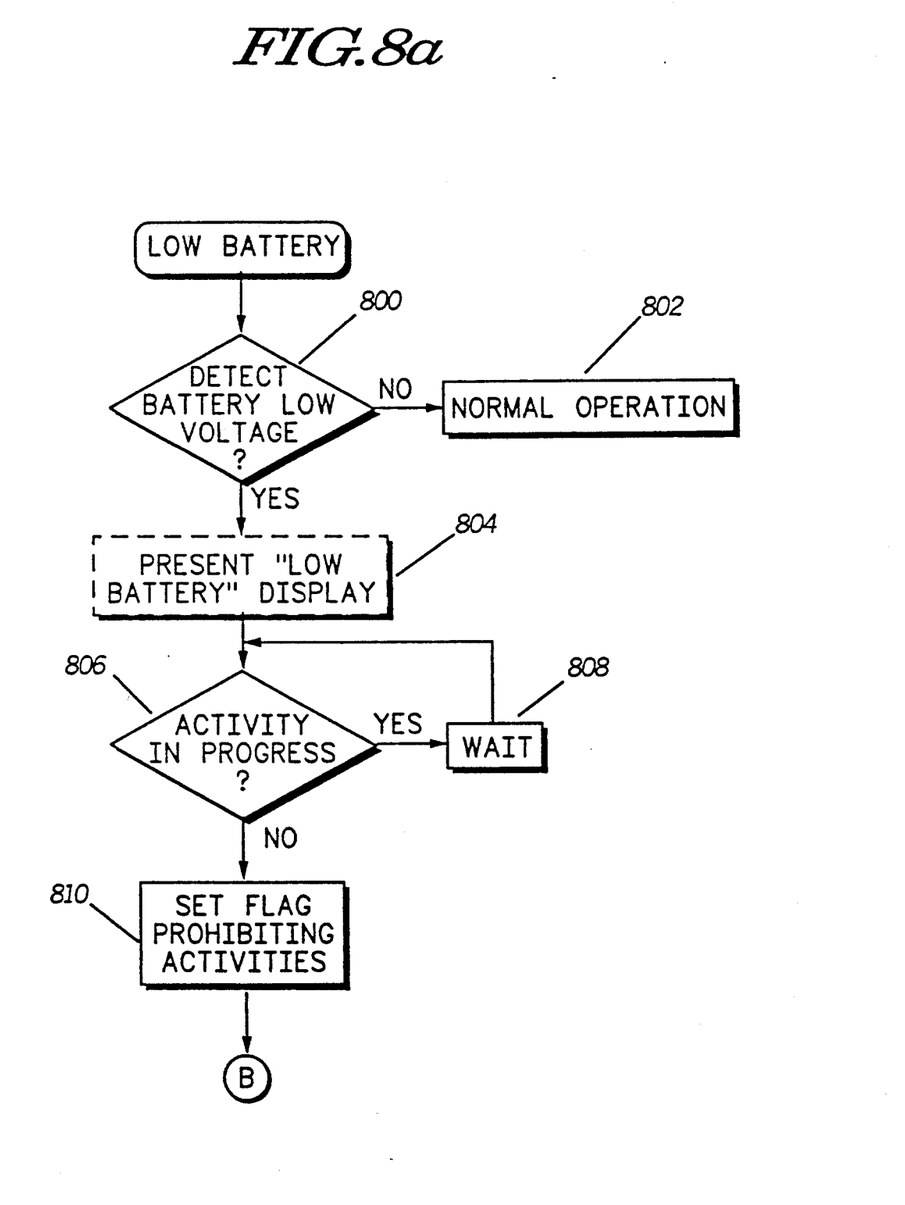
FIGS 8a and 8b are flow diagrams illustrating the steps executed in a low battery condition in accordance with the present invention.
Figure 8B:
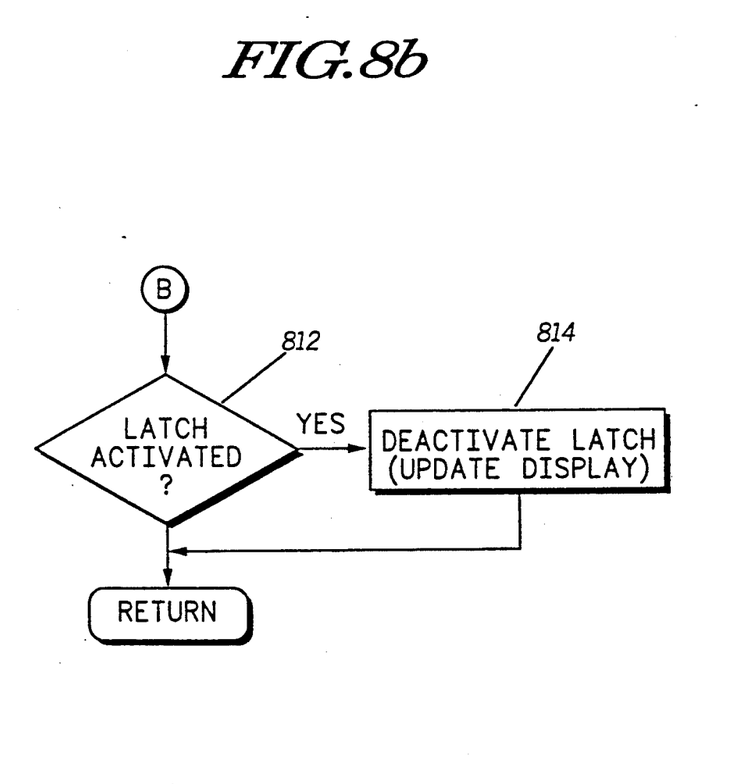

Referring to FIGS. 8a and 8b, there are shown flow diagrams illustrating the preferred communication unit operation when the battery voltage or capacity has fallen to a level where its removal for replacement is required. The routine (controller) begins in decision 800, which determines whether the battery voltage of capacity is below a threshold in accordance with any of several conventional battery measurement techniques. If the determination of decision 800 is that the battery is not low, normal operation continues in step 802. Conversely, an affirmative determination of decision 800 routes the routine (controller) to step 804, where the communication device may optionally display a "Low Battery" display message via the display 138. This message would serve to alert the user that the battery should be changed. The routine (controller) next proceeds to decision 806 to determine whether an activity is in progress that should not be interrupted. If so, the routine (controller) waits (step 808) until the activity has been concluded, after which a flag (software variable or marker) is set or activated (step 810) within the controller memory 118 so as to prohibit the initiation of any further activity that would be detrimentally affected by the unexpected removal of power. Decision 812 next determines whether the latch is currently activated. If so, it is deactivated (step 814) so that the user may safely remove the battery and replace it with a fresh energy source so that communication may continue. Optionally, the display may be updated to indicate that the battery (battery cover) is unlocked.

In summary, the present invention contemplates preventing the removal of an energy source from a communication or other device during times when its removal would be inappropriate or otherwise impede the proper operation of the communication device. Alternately, the latch may be automatically engaged upon power up or battery installation and maintained until such time as an access code has been entered or the battery capacity has been exhausted. In this way, the communication device will not have power randomly or inappropriately interrupted, but rather, only permit the power source to be interchanged under safe and controlled circumstances.

What is claimed is:

1. A method for preventing the physical removal of an energy source from a device comprising the steps of:
   a) attaching the energy source to the device using an attachment means which engages the energy source directly to the device;
   (b) activating a latching means so as to prevent removal of the energy source by prohibiting an energy source release mechanism which is part of the attachment means from operating;
   (c) determining whether an activity is in progress or an event has occurred which is not related to changing the state of the latching means; and
   (d) deactivating the latching means when it is determined that the activity is not in progress or the event has not occurred.

2. The method of claim 1, which includes the step of (e) maintaining the activation of the latching means when it is determined that the activity is still in progress or that the event has occurred.

3. The method of claim 1, which includes the steps of:
   (e) determining whether the energy source has a capacity below a threshold;
   (f) automatically deactivating the latching means when it is determined that the energy source capacity is at least below the threshold.

4. A method for preventing the physical removal of an energy source, comprising the steps of:
   (a) activating a latching means so as to prevent removal of the energy source;
   (b) determining whether an activity is in progress or an event has occurred;
   (c) deactivating the latching means when it is determined that the activity is not in progress or the event has not occurred;
   (d) determining whether the energy source has a capacity below a threshold; and
   (e) deactivating the latching means, after completion of any in progress activity, when it is determined that the energy source capacity is at least below the threshold.

5. A method for preventing the physical removal of a battery from a battery operated device, the battery operated device having a battery release mechanism for releasing the battery, comprising the steps of:
   (a) attaching the battery directly to the battery operated device;
   (b) activating a latching means so as to prevent removal of the battery by prohibiting the operation of the battery release mechanism;
   (c) determining whether the battery has a capacity below a threshold;
   (d) automatically deactivating the latching means when it is determined that the battery capacity is at least below the threshold.

6. The method of claim 5, which includes the further steps of:
   (e) receiving a delatch code;
   (f) determining whether an activity is in progress or an event has occurred;
   (g) automatically deactivating the latching means when it is determined that the activity is not in progress or the event has not occurred.

7. The method of claim 5, wherein in step (b) the latching means is automatically activated upon the battery being attached to the battery operated device.

8. The method of claim 5, wherein step (b) comprises the step of automatically activating latching means after completion of any in progress activity so as to prevent removal of the battery.

9. A method for preventing the physical removal of an energy source, comprising the steps of:
   (a) activating a latching means so as to prevent removal of the energy source;
   (b) determining whether the energy source has a capacity below a threshold; and
   (c) deactivating the latching means after completion of any in progress activity, when it is determined that the energy source capacity is at least below the threshold.

10. A method for preventing the physical removal of an energy source, comprising the steps of:
    (a) installing an energy source;

(b) automatically activating a latching means so as to prevent removal of the energy source;
(c) determining whether the energy source has a capacity below a threshold; and
(d) deactivating the latching means after completion of any in progress activity when it is determined that the energy source capacity is at least below the threshold.

11. The method of claim 10, which includes the step of displaying an indication that the latching means is activated.

12. A communication device comprising:
attachment means for attaching an energy source directly to the communication device, the attachment means further including a release mechanism for releasing the energy source;
means for detecting an event or the occurrence of an activity to provide a detection signal which is not related to changing the state of the release mechanism; and
means for preventing removal of the energy source by prohibiting the operation of the release mechanism in response to the detection signal.

13. The device of claim 12, wherein the communication device is a portable radio and the means for detecting an event or the occurrence of an activity is a radio frequency receiver which provides the detection signal upon a radio frequency signal being received at the receiver.

14. The device of claim 12, which includes:
means for determining whether the energy source has a capacity below a threshold; and
means for enabling the operation of the release mechanism when it is determined that the energy source capacity is at least below the threshold.

15. The device of claim 14, which includes means for displaying an indication that the energy source capacity is at least below the threshold.

16. The device of claim 12, wherein the means for preventing the removal of the energy source comprises a plunger which engages into an aperture found in the release mechanism.

17. A communication device capable of preventing the physical removal of an energy source, comprising:
means for detecting an event or the occurrence of an activity to provide a detection signal;
latching means for preventing removal of the energy source in response to the detection signal;
means for determining whether the energy source has a capacity below a threshold; and
means for allowing the removal of the energy source when it is determined that the energy source capacity is at least below the threshold, the means for allowing removal of the energy source further comprises means for deactivating the latching means after completion of any in progress activity when it is determined that the energy source capacity is at least below the threshold.

18. A communication device capable of preventing the physical removal of an energy source, comprising:
attachment means for directly attaching the energy source to the communication device, the attachment means further including a release mechanism for removing the energy source;
means for preventing removal of the energy source by prohibiting the operation of the release mechanism;
means for determining whether the energy source has a capacity below a threshold; and
means for automatically deactivating the means for preventing the removal of the energy source when it is determined that the energy source capacity is at least below the threshold.

19. The device of claim 18, which includes transmitter means for transmitting an information signal.

20. The device of claim 18, which includes receiver means for receiving an information signal.

21. The device of claim 18, which includes:
means for receiving an access signal;
means for deactivating the means for preventing removal of the energy source when it is determined that an activity in not in progress or an event has not occurred.

22. The device of claim 18, further including a radio frequency receiver means for receiving radio frequency information signals and a means for deactivating the means for preventing removal of the energy source when the receiver is receiving the radio frequency information signal.

23. A continuation device capable of preventing the physical removal of an energy source, comprising:
means for preventing removal of the energy source;
means for determining whether the energy source has a capacity below a threshold; and
means for deactivating the means for preventing the removal of the energy source when it is determined that the energy source capacity is at least below the threshold, the deactivating means further comprises means for deactivating the means for preventing the removal of the energy source after completion of any in progress activity when it is determined that the energy source capacity is at least below the threshold.

24. A communication device capable of preventing the physical removal of an energy source, comprising:
attachment means for attaching the energy source to the communication device, the attachment means further including a release mechanism for removing the energy source;
means for preventing removal of the energy source by prohibiting the operation of the release mechanism;
means for receiving an access signal; and
means for deactivating the means for preventing the removal of the energy source when it is determined that an activity is not in progress or an event has not occurred which is not related to changing the state of the release mechanism.

25. The device of claim 24, which includes transmitter means for transmitting an information signal.

26. The device of claim 24, which includes receiver means for receiving an information signal.

27. The device of claim 24, which includes:
means for determining whether the energy source has a capacity below a threshold; and
means for deactivating the means for preventing the removal of the energy source when it is determined that the energy source capacity is at least below the threshold.

28. The device of claim 24, wherein once the means for receiving an access signal receives a proper access signal, the release mechanism is allowed to operate in order to allow for the removal of the energy source.

* * * * *